Feb. 2, 1932.  S. BRAMLEY-MOORE  1,843,647
FLAVORING MACHINE
Filed April 11, 1930  2 Sheets-Sheet 1

Inventor:
S. Bramley-Moore
By Monroe E. Miller
Attorney.

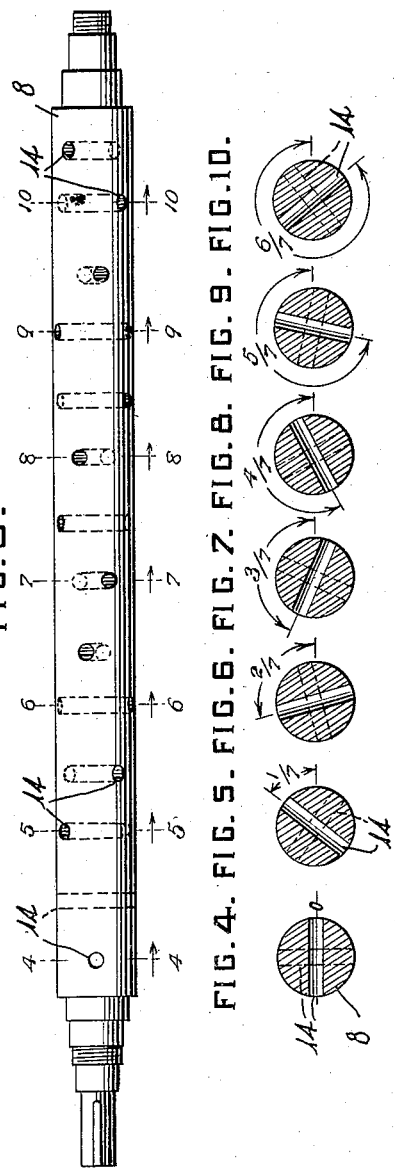

Patented Feb. 2, 1932

1,843,647

UNITED STATES PATENT OFFICE

SWINFEN BRAMLEY-MOORE, OF WHITE PLAINS, NEW YORK

FLAVORING MACHINE

Application filed April 11, 1930. Serial No. 443,583.

The present invention relates to flavoring or aerating machines, and aims to provide a novel and improved machine intended especially for improving the flavor of chocolate, and which may be used for aerating other fluent materials.

Another object of the invention is the provision of a rotor of novel construction adapted to dip in the chocolate or other fluent material and adapted to raise films of the material and move same across a stream of air, so that such films of material are intercepted by the air and in order that the air will carry off vapors and impurities.

The passing of a stream of air through chocolate while in a fluid or semi-fluid condition has been found to improve the flavor and qualities of the chocolate, and the present machine is for the purpose of providing efficient means for bringing the chocolate or other fluent material and air into contact.

With the foregoing and other objects in view, which will be apparent as the description proceeds, the invention resides in the construction and arrangement of parts, as hereinafter described and claimed, it being understood that changes can be made within the scope of what is claimed without departing from the spirit of the invention.

The invention is illustrated in the accompanying drawings, wherein:—

Fig. 2 is an enlarged cross section of the rotor illustrating one pair of grids or screens.

Fig. 3 is an elevation of the rotor shaft.

Figure 1:
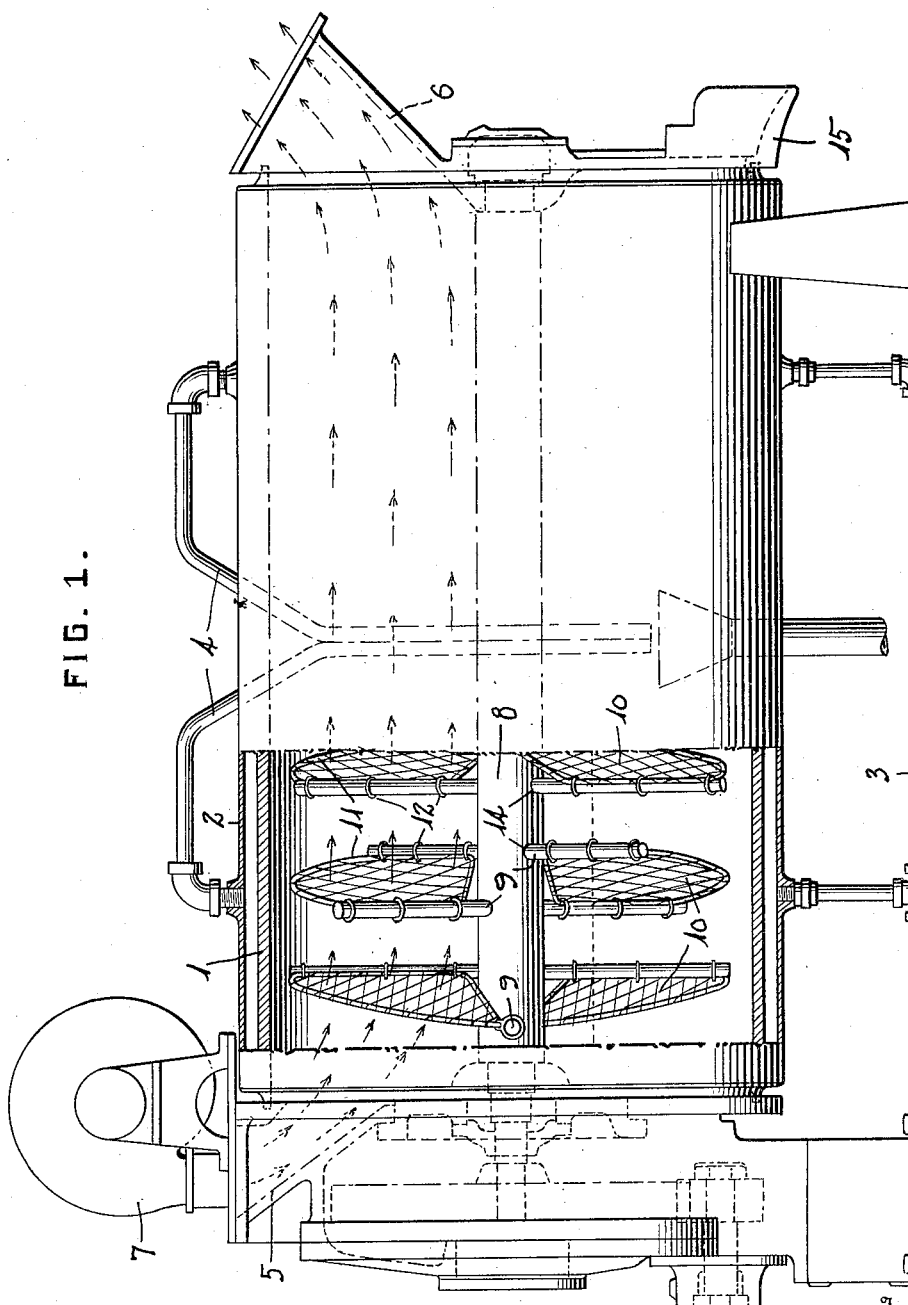
Fig. 1 is a side elevation of the machine, a portion of the cylinder and jacket being broken away to illustrate a part of the rotor.

Figs. 4, 5, 6, 7, 8, 9 and 10 are cross sections on the respective lines 4—4, 5—5, 6—6, 7—7, 8—8, 9—9 and 10—10, respectively, of Fig. 3, showing the positions of the successive pairs of apertures for the grid supporting rods.

The machine comprises a cylinder or casing 1 of suitable size having a jacket 2 through which steam, hot water or other heated fluid may pass for heating the chocolate or other material within the cylinder. The jacket is supplied at the bottom with the heated fluid through the pipe 3, and the fluid discharges at the top of the jacket through the discharge pipes 4, although any suitable provision for the flow or circulation of fluid through the jacket may be provided.

The opposite ends or heads of the cylinder are provided with the air inlet 5 and outlet 6, respectively, near the top of the cylinder, which is arranged with its axis horizontal, and a blower 7 is mounted over or suitably connected with the inlet 5 for directing a stream of air through said inlet to flow longitudinally through the upper portion of the cylinder and out through the outlet 6, as indicated by the arrows in Fig. 1.

A shaft 8 is mounted for rotation in the heads of the cylinder, and may be rotated by any suitable gearing, and forms part of the rotor.

The rotor comprises pairs of dimetrical rods 9 extending through the shaft, and diametrically opposite grids or screens 10 supported by said rods. As shown, the grids are composed of coarse wire mesh with the terminals of the wires bent around stout wire frames 11.

Said frames have eyes or loops 12 welded or otherwise secured thereto and loosely embracing the rods 9. The rods 9 of each pair are spaced longitudinally of the shaft and are arranged at right angles with one another and the grids or screens, with their frames, are pressed into helical form.

The rods 9 are slipped through the loops 12 and shaft 8, in assembling the parts, and the grids will be firmly supported by said rods and cannot be displaced while the rods are in place. The rods are secured to the shaft 8 by means of set screws 13, or the like.

The apertures 14 in the shaft through which the rods 9 extend, as seen in Figs. 3 to 10, inclusive, are arranged at different angles relatively to one another, in order that the successive pairs of grids will be arranged in different relative positions about the axis of the shaft, and the pairs of grids are also spaced apart longitudinally of the shaft, as seen in Fig. 8.

In operation, as the grids move under the shaft 8 they dip in the chocolate or other material, and being arranged in helical or oblique position will have a paddling effect in the chocolate, to assist in stirring or agitating the chocolate and distributing the chocolate over the area of the grids. The chocolate is raised with the grids and is spread out film-like over the area of the grids.

These films of chocolate are carried across the stream of air, and the air flowing through the openings of the grids will break up the films of chocolate and intercept the particles thereof, to aerate the chocolate and carry off undesirable odors and impurities.

The grids spread out the chocolate in film-like or fan shape across the stream of air, and the grids being composed of wire mesh will enable the air to pass through the films of chocolate readily, and the grids will also have a stirring and agitating action in passing through the chocolate or material. As a result of the action of the grids in the chocolate and the action of the air in passing through the grids, the flavor and quality of the chocolate are improved to a marked degree.

The cylinder 1 has a discharge spout 15 through which the treated chocolate is discharged, a suitable gate being provided to control the discharge outlet.

Having thus described the invention, what is claimed as new is:

1. A machine of the character described comprising a rotor having diametrical rods at different angles, and grids having portions embracing said rods, said portions of each grid engaging a pair of rods arranged at an angle to one another in order to maintain the grid in position on said rods.

2. A machine of the character described comprising a rotor including a shaft, diametrical rods carried by the shaft and arranged at different angles and spaced longitudinally of the shaft, and separate individual helically arranged grids between said rods and having portions detachably engaging said rods.

3. A machine of the character described comprising a rotor including a shaft, diametrical rods secured through said shaft, at different angles, and grids having loops embracing said rods, said loops of each grid engaging two rods arranged at an angle relatively to one another in order to maintain the grid in position on said rods.

4. A machine of the character described having a rotor comprising a shaft, pairs of diametrical rods extending through said shaft, at different angles and spaced longitudinally thereon, and diametrically opposite helically arranged grids between and connected with each pair of said rods.

5. A machine of the character described having a rotor comprising a shaft, pairs of diametrical rods extending through said shaft at different angles and spaced longitudinally thereon, and diametrically opposite helically arranged grids between said rods and having loops embracing each pair of said rods.

6. A machine of the character described comprising a casing, means for producing a stream of air through the casing above material therein, a substantially horizontal shape mounted for rotation in the casing, pairs of rods extending through the shaft, the rods of each pair being arranged at an angle relatively to one another, and the pairs of rods being arranged at different relative angles, and diametrically opposite helical fan-shaped grids between and having portions embracing each pair of said rods.

7. A machine of the character described comprising a casing, means for producing a stream of air through the casing, a substantially horizontal shaft mounted for rotation in the casing, and pairs of diametrically opposite helical grids mounted on the shaft at longitudinally spaced points thereof and arranged at different angles around the axis of the shaft, to dip in said material and move across said stream of air.

In testimony whereof I affix my signature.

SWINFEN BRAMLEY-MOORE.